Dec. 8, 1936.       G. AGOSTINETO       2,063,653
LEATHER KNIFE
Filed Feb. 25, 1936       2 Sheets-Sheet 2
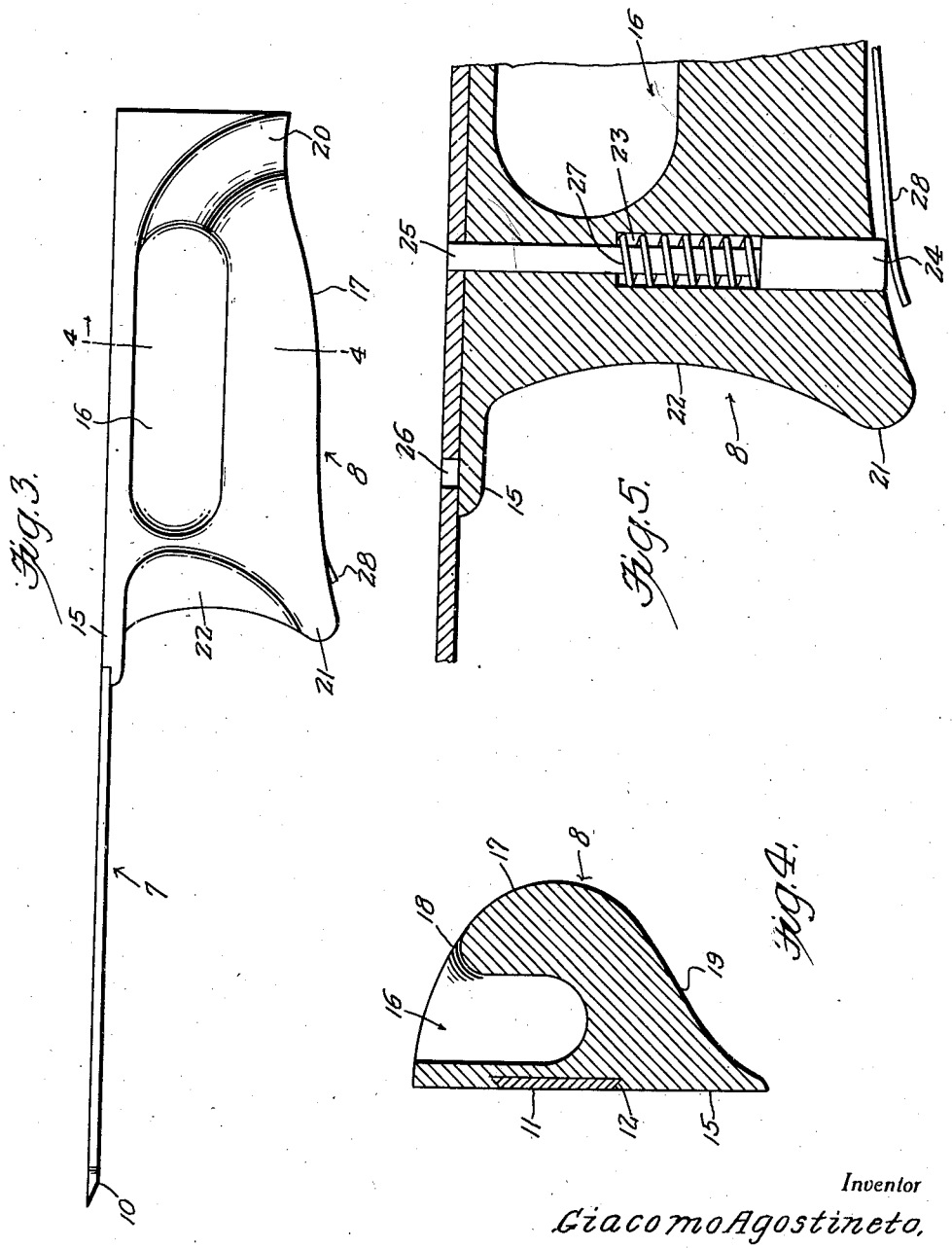
Inventor
Giacomo Agostineto,
By Clarence A. O'Brien and
Hyman Berman
Attorneys Patented Dec. 8, 1936

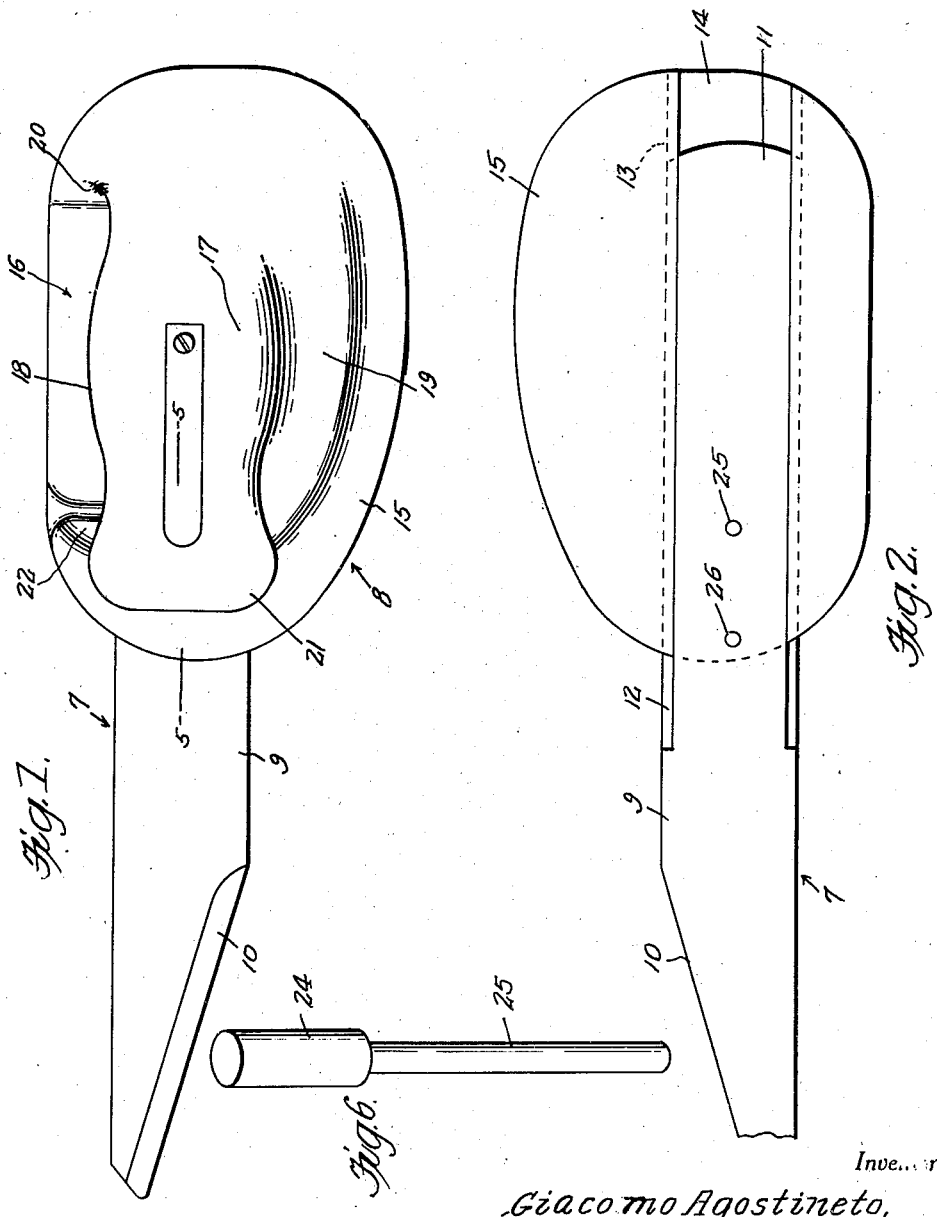

2,063,653

UNITED STATES PATENT OFFICE 2,063,653

LEATHER KNIFE

Giacomo Agostineto, Trout Creek, Mich.

Application February 25, 1936, Serial No. 65,679

6 Claims. (Cl. 30—9)

Introducing the present invention, it is believed sufficient to say that it is an improved leather knife such as is especially, but not necessarily, adapted for use by shoemakers to expedite paring and cutting sole leathers into pieces and patterns of predetermined character.

Briefly and broadly stated, the principal structural newness which serves to characterize and individualize the knife, as a unit, resides in an arrangement embodying a holder or stock having an unusual hand-grip, and a cutting blade having its shank portion detachably connected with said holder.

Of primary and outstanding importance, however, is the particular construction and configuration of that part of the assemblage which might well be called the handle.

Notwithstanding the efforts on the part of manufacturers to provide satisfactorily shaped handles for knives of this class, they are open to severe criticism due to the infirmity of grip accorded the user, and the lack of safety in protection for the hand particularly the knuckles.

Thoughtful experimentation and due deliberation in the hope of providing a more satisfactory handle has led to the perfection of one which is especially useful for the purposes intended. That is to say, I have evolved and produced a handle ingenious because of its structural adaptability, an arrangement which transcends in nature and appropriateness prior art devices in the same line of endeavor and something which is possessed of readiness of compliance to a natural grip affording facility of handling and use.

To consider the invention from another viewpoint, it might be mentioned that, in contrast to competitive structures, it is possessed of a selection and transformation of peculiar features and shapes calculated to provide a well balanced design which insures a positive grip, guards against accidental slippage, and fully shields and protects the hand of the user.

Other features and advantages will become more readily apparent from the following description and drawings:

In the accompanying drawings, exemplifying the preferred embodiment of the invention:

Figure 1 is a top plan view of a construction representing the complete knife embodying the features and advantages of my particular conception;

Figure 2 is a bottom plan view of Figure 1;

Figure 3 is what might be referred to as an edge elevational view, that is, a view looking down on Figure 1 of the drawings;

Figures 4 and 5 are sectional views of a fragmentary detail character, taken on the planes of the lines 4—4 and 5—5, respectively, of Figures 3 and 1;

Figure 6 is a perspective detail view.

The knife blade is unitarily denoted by the numeral 7 and the holder or handle structure by the numeral 8. As before indicated, the chief novelty resides in the formation of the part 8. It might be mentioned, however, that the knife comprises an appropriate blade 9 having a diagonal or oblique cutting edge 10. The attaching shank is shown better in Figure 2, indicated by the numeral 11, and has beveled retention edges 12 to fit into undercut grooves 13 in the marginal walls of the main keeper groove 14 in the bottom of the holder.

The holder is of one piece and constructed of appropriate light weight and durable material. An outstanding part thereof is the portion which may be identified as the shank-accommodation and shield-forming base 15. This is of somewhat ovate configuration and outline and is flat on the bottom, that is, on the side to which the shank 14 is adjustably and detachably connected. It is of sufficient area to perform as a satisfactory hand shield or guard. As shown to advantage in Figure 4, the handle is fashioned with an integral grip in the nature of a lateral enlargement whose configuration and shape lends itself to fit nicely and firmly in the hand of the user. That is to say, it conforms substantially to a natural hand-embracing grasp or hold. Of outstanding importance as a feature of this hand-grip is a cavity or recess longitudinally elongated and indicated by the numeral 16. This constitutes a pocket or seat for reception of the fingers of the hand. One wall of this recess rounds off and merges into the palm resting or crown portion 17, the rounded juncture between the parts being denoted at 18 in Figure 4. Then the surface of the grip merges on gradually as at 19 into the base. As shown effectively in Figure 1, this sloping portion 19 has a longitudinal sweeping curve which may be said to be a convex rest or bearing surface for the butt of the hand. Then as indicated at 20 the structure is fashioned at one end of the pocket to provide a slightly arcuate niche which functions effectively as a seat for the little finger of the hand, this seat being distinguished by the numeral 20. At the forward portion the grip is fashioned to define a projection 21 which is pommel-like in nature and serves as a sort of an antislipping knob. This overhangs or projects beyond a concavity 22 forming the frontal portion and is utilized as a thumb guard and adapter seat. These features provide the desired collective union of factors which makes for requisite conformation to the hand permitting the fingers to be nested in the pocket 16 with the palm resting against the rounded abutment or grip 17 and the thumb in the recess 22 underneath the guard 21. Thus we have in this arrangement a self-evident reassurance of reliability and confidence in the grip. There is no likelihood of the handgrip slipping out of the hand of the user in directions at right angles to the forearm and hence the needed heavy pull on the knife is not apt to accidentally displace it from the hand. It is evident, however, that experience with the actual use of the tool will serve to define the nature of an invention difficult to portray satisfactorily in the drawings.

Of supplemental importance in the arrangement is the provision of a socket 23 as shown in Figure 5 which serves to accommodate the reciprocatory head 24 of the plunger or latch pin 25. This is selectively receivable in the keeper holes 26 in the shank of the blade. The latch is normally forced out to automatic releasing position by a coiled expansion spring which surrounds it and is confined in the socket. The spring is indicated at 27. The spring is held compressed and the latch projected to latching position by way of an appropriate flat spring metal clip 28 which presses against the head 24 and is itself suitably anchored in a groove in the grip 17.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A leather knife for shoemakers and cobblers comprising a handle including a substantially elliptical flat-bottom plate constituting a knuckle guard, a protuberant enlargement formed integral with one side of said plate and projecting laterally therefrom within the marginal limits of the plate and serving as a hand-clutching hand-grip and being provided with a recess forming a pocket disposed in parallelism to the base plate to accommodate and permit anchorage of the fingers therein, and a knife having its shank portion attached to the flat bottom of said plate and projecting in a plane therewith beyond the marginal edge of the plate.

2. In a structure of the class described, a handle including a shield-forming base, an integral hand-shaped grip, said grip being provided with a recess designed for reception of the fingers of the hand of the user and further including at its frontal portion a pommel-like guard and an underlying concavity to accommodate the thumb.

3. As a new article of manufacture, a handle for a knife comprising a substantially elliptical flat bottom base plate and a lateral integral grip joined to said plate and confined within the marginal limits of the plate, said grip being provided with an elongated recess to accommodate the fingers of the hand, having a convex portion serving as an abutment and rest for the butt of the hand, having a frontal extension constituting a thumb guard, and a portion underlying said extension shaped to conform to the curved thumb to facilitate maintenance of a satisfactory and reliable grip.

4. A shoemaker's leather knife comprising a handle including a substantially oval-shaped base member flat on one side and serving essentially as a hand and finger protecting shield, a cutting knife having a shank attached to the flat side of said base and projecting in a plane therefrom beyond the marginal edge thereof, and a hand-grip formed integrally on the opposite side of the base plate and projecting at substantial right angles in respect to the longitudinal dimension of the knife, said handle grip being fashioned to permit it to be comfortably nested in the clutched hand of the user and being provided with a finger receiving recess to provide the requisite clenched handhold.

5. A leather knife perfected for use by shoemakers comprising a handle including a plate portion proportionate and shaped to virtually cover the entire clutched hand of the user and to thereby function as a shield, a knife attached to the shield and projecting beyond one end thereof, and a hand-grip carried by said plate and confined within the marginal edges thereof, said hand-grip being shaped in configuration to fit comfortably into the clenched hand and having means to accommodate the fingers to guard against slippage or means to serve as a firm rest for the butt of the hand and being provided with an extension projecting in parallelism to the base plate on the knife side to function as a retention element for the thumb.

6. A leather knife of the class described comprising a handle including an attaching and shield forming plate having a groove formed therein, a knife disposed in a plane flush with one side of said plate and having a shank located in said groove, said shank being formed with longitudinally spaced selectively usable keeper holes, said handle also including a hand-grip projecting at right angles to the shank of the knife and provided with an automatic spring released latch engageable with the keeper holes, and an externally arranged conveniently located clutch on the hand-grip engageable with the latch to compress the spring and retain it normally engaged with one of the keeper holes in the shank of the knife.

GIACOMO AGOSTINETO.